United States Patent [19]

Balsley et al.

[11] 4,002,605
[45] Jan. 11, 1977

[54] CALCIUM AND MAGNESIUM SALTS OF 4-(2-HYDROXY-1-NAPHTHYLAZO)-1-NAPHTHALENESULFONIC ACID FOR DYEING FIBERGLASS

[75] Inventors: Richard Benjamin Balsley, Lebanon; Herbert Soffer, Fanwood; Woodrow Wilson Robbins, Bound Brook, all of N.J.

[73] Assignee: American Cyanamid Company, Stamford, Conn.

[22] Filed: Aug. 28, 1974

[21] Appl. No.: 501,302

[52] U.S. Cl. .................................. 260/195; 8/8; 106/50

[51] Int. Cl.² ............... C09B 29/16; D06P 3/80; C03C 13/00

[58] Field of Search ........................ 260/150, 195

[56] References Cited

UNITED STATES PATENTS

| 356,672 | 1/1887 | Vollbrecht et al. | 260/195 |
|---|---|---|---|
| 1,016,307 | 2/1912 | Wagner et al. | 260/195 |
| R9,144 | 6/1878 | Caro | 260/195 |

OTHER PUBLICATIONS

Colour Index, Third Edition, vol. 4, pp. 4078–4081, C.I. Number 15510, 15510:1, 15510:2, 15510:3 and 15620.

Primary Examiner—Daniel E. Wyman
Assistant Examiner—John J. Doll
Attorney, Agent, or Firm—John L. Sullivan

[57] ABSTRACT

Dyes of the formula:

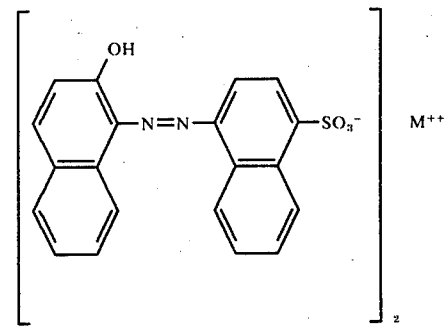

wherein M is a metal selected from calcium and magnesium and provided that where M is calcium the dye is in the beta crystalline form are superior dyes for the dyeing of fiberglass in that they are resistant to crystal growth in dye pastes and recycle process water in the dyeing of fiberglass. Thus, in the spray dyeing of the fiberglass the dyes do not tend to clog the nozzle of the spraying device as do the corresponding salts of monovalent metals, such as the sodium salt.

3 Claims, No Drawings

CALCIUM AND MAGNESIUM SALTS OF 4-(2-HYDROXY-1-NAPHTHYLAZO)-1-NAPHTHALENESULFONIC ACID FOR DYEING FIBERGLASS

This invention relates to novel dyes having the formula:

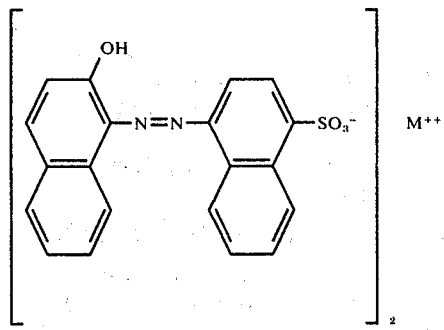

wherein M is a metal selected from the group consisting of calcium and magnesium. Still further, this invention relates to compositions containing said dyes for the dyeing of fiberglass.

The sodium salt of 4-(2-hydroxy-1-naphthylazo)-1-naphthalenesulfonic acid has been used to dye fiberglass for many years under the designation Acid Red 88, Color Index 15620. Unfortunately, in the presence of recycle process water which is used in dyeing fiberglass, a dye dispersion which contains Acid Red 88 converts to larger crystals which cause difficulties because the resulting crystals clog the orifices of spraying devices. In addition, dye pastes formulated with Acid Red 88 undergo crystal growth on storage and the resulting larger crystals cause difficulties in the dyeing process.

We have found that the aforementioned deficiencies in Acid Red 88 can be overcome by using the novel dye compounds of this invention. We have found that the magnesium salt of this invention and a novel crystalline form of the calcium salt, hereinafter referred to as the beta form, are resistant to crystal growth on storage as a paste and in contact with recycle process water.

The novel beta form of the calcium salt is prepared by coupling a diazotized solution of the sodium salt of 1-amino-4-naphthalenesulfonic acid, also called sodium naphthionate, with 2-naphthol. The diazo solution is prepared by adding sodium naphthionate to an aqueous alkaline solution which has been adjusted to pH 11.5 to 12.2 with sodium hydroxide. To this solution is added in aqueous solution containing from 1.0 to 1.02 moles of sodium nitrite per mole of sodium naphthionate while keeping the temperature about 25° to 30° C. The resulting mixture is stirred until the solid material is completely dissolved. The solution is then added over a period of about 1½ hours to a dilute solution of hydrochloric acid at 16° C. to 20° C. to form the diazonium salt.

A solution of sodium 2-naphtholate is prepared by adding from 1.0 to 1.02 moles of 2-naphthol per mole of sodium naphthionate used in the preparation of the diazo solution, and sodium hydroxide to water at room temperature and stirring until the solid material is dissolved.

A coupling reaction is carried out by adding the diazo solution to the solution of sodium 2-naptholate over about ½ to 1 hour at 12° to 15° C. and a pH of about 12.2. Stirring is continued, without cooling, until qualitative tests indicate no diazo compound is present. To the reaction mixture is then added one mole of calcium chloride per mole of sodium naphthionate used, whereby the calcium salt of 4-(2-hydroxy-1-naphthylazo)-1-naphthalenesulfonic acid is precipitated. The reaction mixture is then heated to the boil, diluted with water, and held at the boil until an examination of an aliquot under a microscope shows that crystal growth has ceased. This may require heating at the boil for several hours. This heating of the reaction mixture, hereinafter referred to as the "heat treatment", converts the alpha form of the dye salt which is initially precipitated to the beta form. The reaction mixture is then diluted with more water and filtered to separate the solid which is the beta form of the calcium salt dye product. The filter cake is then washed with water until the washings show a pH of 8.9 or less.

As previously indicated, the alpha form of the dye salt is undesirable because it slowly converts on aging as a paste to large crystals of the beta form, which subsequently cause difficulties by clogging spraying devices used in the dyeing of fiberglass batting. However, this problem is obviated by the present invention. Thus, when a dye paste is made starting with crystals of the beta form, the ground crystals are not subject to growth on aging of the paste.

The corresponding magnesium salt is prepared by a similar process wherein an equivalent amount of magnesium chloride is substituted for the calcium chloride.

The dye is formulated into a paste by ball milling it with urea, a dispersing agent, an antifoaming agent and a biostat in water until a 2.5 gram sample of the paste when added to 250 ml. of water at 48°–50° C. can be filtered through two superimposed Whatman No. 4 filter papers within one minute, with only a trace of residue on the paper, when a vacuum of 27 to 29 inches is applied to the system. (This usually requires ball milling for at least eight hours). At this point, the paste is adjusted to the desired final solids content and viscosity by adding water and a thickening agent, preferably carboxymethylcellulose. The adjusted paste is then ball milled for an additional two hours and discharged through a 200 mesh screen.

A dye paste of 100 parts by weight broadly comprises from 20 to 40 parts of real dye, from 0.5 to 2.0 parts of urea, from 0.1 to 2.0 parts dispersing agent, from 0.02 to 0.2 part of antifoam agent, from zero to 1.5 parts of thickener and from 0.01 to 0.1 part of a biostat with the remainder being water. Preferably 100 parts by weight of dye paste comprises from 25 to 30 parts of real dye, from 0.75 to 1.5 parts of urea, from 0.25 to 0.75 part of dispersing agent, from 0.05 to 0.15 part of antifoam agent, from 0.75 to 1.25 parts of thickener and from 0.025 to 0.075 part of a biostat, with the remainder being water.

A typical paste formulation is as follows:

| Materials | Parts |
| --- | --- |
| Real dye | 36.00 |
| Urea | 1.00 |
| Marasperse CB(a) | 0.50 |
| Antifoam DB-31(b) | 0.10 |
| Giv Gard DXN(c) | 0.50 |
| CMC-70 (low)(d) | 1.00 |

| Materials | Parts |
| --- | --- |
| Water | 61.35 |

(a)Marasperse CB (American Can Co.) is an anionic dispersant, sodium lignosulfonate.
(b)Antifoam DB-31 (Dow Corning) is a silicone emulsion.
(c)Giv Gard DXN (Givaudan Corp.) is a biostat, 6-acetoxy-2,4-dimethyl-m-dioxane.
(d)CMC-70 (low) is a thickening agent, carboxymethyl cellulose.

The present invention will be more fully illustrated in conjunction with the following examples which are intended for that purpose. Except as otherwise noted, all parts are by weight and temperatures are in degrees centigrade.

EXAMPLE 1

This example shows the preparation of the beta crystalline form of the calcium salt of 4-(2-hydroxy-1-naphthylazo)-1-naphthalenesulfonic acid.

To 490 ml. of water at 25°–30° C. is added 88.9 g. (69.3 g. real, 0.265 mole) of sodium naphthionate, 2 drops of sodium hydroxide solution (24%) and 66.5 ml. of sodium nitrite solution (25%). The reaction mixture is then stirred at 25 to 30° C. until the solid material is dissolved.

To a 1500 ml. glass beaker is charged 238 ml. of water and 61.3 ml. of 20° Be' hydrochloric acid. The hydrochloric acid is diluted to a volume of 443 ml. at 16° C. by adding water to the solution.

The solution containing sodium naphthionate is then added to the hydrochloric acid solution at 16°–20° C. over a period of ½ hours to form a solution of the diazonium chloride. The solution is then stirred for ½ hour, cooled to 12°–15° C. and diluted with water to a volume of 1400 ml.

A solution of sodium 2-naphtholate is prepared by mixing 210 ml. of water, 59.7 ml. of sodium hydroxide solution (24%), 41.0 g. (0.285 mole) of 2-naphthol. The mixture is stirred until the solid dissolves and then diluted with water to a volume of 567 ml. at 12°–15° C.

A coupling reaction is carried out by adding the solution of the diazonium chloride to the solution of sodium 2-naphtholate over about ½ hour at 12°–15° C. at a pH of 12.2. The reaction mixture is stirred for two hours without cooling and 26.8 g. real of calcium chloride is added thereto. The reaction mixture is then heated to the boiling point, held at the boil for ½ hour, diluted to 3400 ml. at 74° C. and filtered. The filter cake is washed with water until the pH of the washings is 8.9 or lower and sucked dry. The filter cake has a solids content of about 48.2%.

EXAMPLE 2

This example shows the preparation of a dye paste having good crystallization resistance.

A dye paste is prepared by charging to a one quart ball mill containing pebbles the following materials:

| Materials | Parts by Weight |
| --- | --- |
| Filter cake from Example 1 | 207.0 |
| Urea | 3.75 |
| Marasperse CB | 1.90 |
| Antifoam DB-31 | 0.10 |
| Giv Gard DXN | 0.10 |
| Water | 87.00 |

The mill is sealed and rolled for 20 hours. At the end of this period the mill is opened and the following materials are added to the mixture.

| Materials | Parts by Weight |
| --- | --- |
| CMC-70 low | 3.75 |
| Water | 71.0 |

The mill is then sealed and rolled for an additional 2 hours. The mill is then opened and the contents are discharged to obtain a product having a viscosity of about 425 cps and a pH of 8.8.

The dye paste has a viscosity of about 385 cps after standing 3 days.

CRYSTALLIZATION RESISTANCE OF PASTE

A one ounce bottle is half-filled with the paste prepared in Example 2 and placed in an 80° C. oven, with a loose cap thereon, until the temperature of the paste approaches 80° C. The cap is then tightened and the bottle is maintained at 80° C. After 6 days have elapsed the paste is examined under a microscope. The sample has good crystallization resistance, that is, there is no growth of the dye crystals.

Microscopic examination of a sample of the dye paste after standing 5 weeks at room temperature shows no evidence of crystal growth.

CRYSTALLIZATION RESISTANCE IN RECYCLE PROCESS WATER

To a one ounce bottle is added 15 ml. of a recycled process water and two drops of the paste prepared in Example 2 and the contents shaken well. After storage at room temperature for 48 hours, no evidence of precipitation or crystallization growth is seen upon microscopic examination of the solution.

EXAMPLE 3

This example shows that the crystalline form of the calcium salt before the heat treatment is different from the crystalline form after the heat treatment. The x-ray patterns of the two forms indicate that they are polymorphs.

Sample A: This sample represents the alpha form, i.e., the product salt isolated by filtration of the reaction mixture without the heat treatment.

Sample B: This sample represents the beta form. It is prepared by heating 200 grams of Sample A in 3 liters of water at 90°–100° C. for 1 hour and then isolating the product salt.

The x-ray diffraction patterns of the samples are shown below:

| | Interplanar Spacings (A°) | Peak Intensity |
| --- | --- | --- |
| Sample A | 15.7 | 35 |
| | 8.80 | 85 |
| | 7.69 | 100 |
| | 5.27 | 30 |
| | 3.39 | 60 |
| Sample B | 17.4 | 45 |
| | 8.66 | 10 |
| | 7.62 | 100 |
| | 3.54 | 10 |

EXAMPLE 4

This example shows that the alpha form of the calcium salt has poor crystallization resistance in a paste.

The procedure of Example 1 is followed except that after the addition of the calcium chloride the reaction mixture is not subjected to heat treatment. The solid is filtered and washed as in Example 1. The filter cake has a solids content of 43.0%.

A 174.0 g. sample of the filter cake is ball-milled with 3.0 g. of urea, 1.5 g. of Marasperse CB, 0.15 g. of Giv Gard DXN, 0.3 g. of Antifoam DB-31 and 81.0 g. of water for 16 hours. Amounts of 2.2 g. of CMC-70 (Low) and 16.0 g. of water was added and ball-milling is continued for 2 hours.

A 2.5 g. sample of the paste when added to 250 g. of water and filtered through two superimposed No. 4 Whatman filter papers show very few particles thus indicating sufficient milling at this point. The viscosity of the paste is 245 cps. The crystals consist of 1–2 micron particles.

After storage at 80° C. for 5 days as in Example 2, the sie of the crystals increases to 5–8 microns. After standing at room temperature for one month, the size of the crystals increases to 5–10 microns.

EXAMPLE 5

This example shows that the sodium salt of 4-(2-hydroxyl-1-naphthylazo)-1-naphthalenesulfonic acid in the presence of recycle process water produces large crystals.

One drop of a dye paste containing the sodium salt of 4-(2-hydroxyl-1-naphthylazo)-1-naphthalenesulfonic acid is added to 15 ml. of recycle process water at room temperature. After 2 hours microscopic examination showed that the crystals were needles about 25 microns long. After 20 hours the crystals were found to be very large bundles of rectangles, up to about 150 microns in length.

EXAMPLE 6

This example shows the preparation of the magnesium salt of 4-(2-hydroxy-1-naphthylazo)-1-naphthalenesulfonic acid.

The procedure of Example 1 is used except that 27.0 grams of magnesium chloride is added instead of calcium chloride. The filter cake weights 281.3 grams and has a solids content of 37.8%.

EXAMPLE 7

This example shows the formulation of a dye paste with the magnesium salt of 4-(2-hydroxy-1-naphthylazo)-1-naphthalenesulfonic acid.

The procedure of Example 2 is used employing the following materials.

| Materials | Parts Per 100 Parts of Paste |
|---|---|
| Filter Cake from Example 6 | 72.74 |
| Urea | 0.90 |
| Marasperse CB | 0.45 |
| Antifoam DB-31 | 0.03 |
| Giv Gard DXN | 0.03 |
| CMC-70 (low) | 0.50 |
| Water | 25.35 |

The resulting paste has a viscosity of 1525 cps and consists mainly of crystals about 1–2 microns long. A sample of the paste shows good resistance to crystal growth after storage at 80° C. for 5 days. The paste also shows good resistance to crystal growth when dispersed and stored in recycle process water at room temperature.

EXAMPLE 8

The dye paste of Example 2 is dispersed in an aqueous solution of a urea-phenol-formaldehyde resin and the mixture is sprayed onto a fiberglass batting. The batting is then heated for 3 minutes in an oven maintained at 450° F. in order to cure the resin. The treated batting is dyed a red shade.

EXAMPLE 9

The dye paste of Example 6 is dispersed in water and dyed on fiberglass batting using the procedure of Example 8. The treated batting is dyed an orange shade.

We claim:

1. A dye represented by the formula:

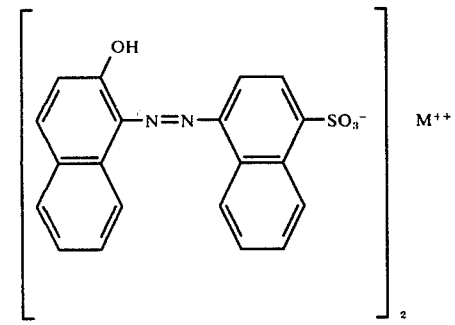

where M is selected from the group consisting of calcium and magnesium; provided that where M is calcium, said dye is characterized by an X-ray diffraction pattern with lines at interplanar spacings in Angstroms of 17.4, 8.66, 7.62 and 3.54 and relative intensities of 45, 10, 100 and 10, respectively.

2. A dye according to claim 1 wherein M is calcium.

3. A dye according to claim 1 wherein M is magnesium.

* * * * *